United States Patent [19]

Altermatt

[11] Patent Number: 5,101,021

[45] Date of Patent: Mar. 31, 1992

[54] 4-(5',6'-AND 6',7'-DIHALOBENZOTHIAZOL-2'-YLAZO)-3-METHYL-N-METHYL-N-[(ACETOXY OR METHOXYCARBONYLOXY)-$C_{2-3}$ALKYL-]ANILINES AND MIXTURES THEREOF

[75] Inventor: Ruedi Altermatt, Buckten, Switzerland

[73] Assignee: Sandoz Ltd., Basel, Switzerland

[21] Appl. No.: 529,054

[22] Filed: May 25, 1990

Related U.S. Application Data

[63] Continuation-in-part of Ser. No. 279,380, Dec. 2, 1988, abandoned.

[30] Foreign Application Priority Data

Dec. 4, 1987 [DE] Fed. Rep. of Germany ....... 3741115

[51] Int. Cl.$^5$ .................... C09B 29/045; C09B 29/09; C09B 67/22; C09B 67/48; D06P 1/18
[52] U.S. Cl. ...................... 534/788; 534/575; 8/639
[58] Field of Search ...................... 534/788, 575; 8/638

[56] References Cited

U.S. PATENT DOCUMENTS

| 4,734,101 | 3/1988 | Himeno et al. ............... 534/788 X |
| 4,785,083 | 11/1988 | Zirngibl ......................... 534/575 |

FOREIGN PATENT DOCUMENTS

| 2251706 | 4/1974 | Fed. Rep. of Germany ...... 534/575 |
| 45-8750 | 3/1970 | Japan . |
| 48-27730 | 8/1973 | Japan ................................. 534/788 |
| 63-161058 | 7/1988 | Japan ................................. 534/788 |
| 63-210172 | 8/1988 | Japan ................................. 534/575 |
| 1324235 | 7/1973 | United Kingdom ............... 534/788 |
| 1351375 | 4/1974 | United Kingdom ............... 534/788 |

Primary Examiner—Mary Lee
Assistant Examiner—Fiona T. Powers
Attorney, Agent, or Firm—Gerald D. Sharkin; Richard E. Vila; Melvyn M. Kassenoff

[57] ABSTRACT

Compounds of the formula

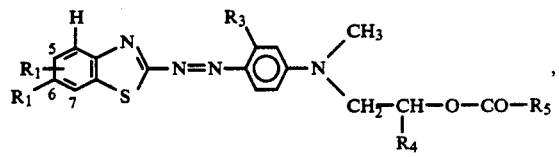

and mixtures of such compounds, wherein each $R_1$ is independently halo, $R_3$ is hydrogen or methyl, with the proviso that when $R_5$ is ethoxy, $R_3$ must be methyl, $R_4$ is hydrogen or methyl, and $R_5$ is hydrogen; $C_{1-2}$alkyl; $C_{1-2}$alkyl monosubstituted by halo; phenoxymethyl; vinyl; $C_{1-4}$alkoxy; $C_{2-5}$alkoxy monosubstituted by $C_{1-2}$alkoxy or halo; allyloxy; phenoxy or benzyloxy, useful as disperse dyes for the dyeing of substrates such as polyester by, for example, the rapid dyeing method and substrates dyed therewith.

20 Claims, No Drawings

4-(5',6'-AND 6',7'-DIHALOBENZOTHIAZOL-2'-YLAZO)-3-METHYL-N-METHYL-N-[(ACETOXY OR METHOXYCARBONYLOXY)-C$_{2-3}$ALKYL]ANILINES AND MIXTURES THEREOF

This is a continuation-in-part of application Ser. No. 07/279,380, filed Dec. 2, 1988 and now abandoned.

The invention relates to new disperse dyes.

According to the invention there is provided compounds of formula I

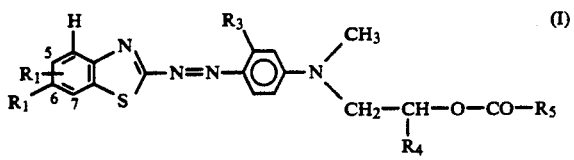

in which each $R_1$, independently, is halogen;

$R_5$ is hydrogen; methyl or ethyl, unsubstituted or monosubstituted by halogen; vinyl; phenoxymethyl; $C_{1-4}$alkoxy; phenoxy; benzyloxy; allyloxy; or $C_{2-5}$alkoxy, monosubstituted by $C_{1-2}$alkoxy or halogen;

$R_3$ is methyl or, when $R_5$ is other than ethoxy, additionally hydrogen; and $R_4$ is hydrogen or methyl.

Preferably any halogen group in $R_5$ is chloro.

Preferably $R_1$ is $R_1'$ where $R_1'$ is fluoro, chloro or bromo. More preferably $R_1$ is $R_1''$ where $R_1''$ is chloro or bromo, most preferably chloro. While both $R_1$ groups, both $R_1'$ groups and both $R_1''$ groups may be the same or different, they are preferably the same.

Preferably $R_3$ is methyl.

Preferably $R_4$ is hydrogen.

The $C_{1-2}$alkoxy group of any $C_{2-5}$alkoxy substituted by $C_{1-2}$alkoxy is preferably in a position other than the 1-position.

Preferably $R_5$ is $R_5'$ where $R_5'$ is methyl, methoxy, ethoxy or ethoxy monosubstituted in the 2-position by methoxy or ethoxy. More preferably $R_5$ is $R_5''$ is where $R_5''$ is methyl or methoxy, most preferably methyl.

For the avoidance of doubt, reference to compounds of formula I include mixtures of compounds of formula I either with compounds of formula I or with disperse dyes other than of formula I (preferably however the former).

Preferably the diazo component in compounds of formula I is a mixture of 5,6- and 6,7-dihalobenzothiazolyl groups (as shown in formula I).

The preferred mixtures contain two compounds of formula I that are identical except for the position (5 or 7) of the floating $R_1$ substituent. Preferably, the ratio of the two compounds is 2:1 to 1:2, more preferably 3:2 to 2:3, even more preferably 11:9 to 9:11 and most preferably it is 1:1, 9:11 or 11:9.

Preferred compounds of formula I are those of formula I'

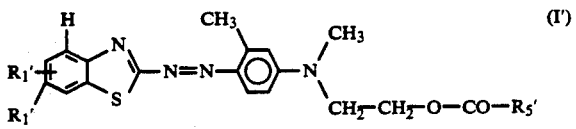

where $R_1'$ and $R_5'$ are as defined above.

The mixture of compounds of formula I' where each $R_1'$ is chloro and $R_5'$ is —CH$_3$ (defined as formula Ia below) in the amorphous α-modification (either as dry compounds or in aqueous suspension) can be converted by heating, at a temperature of 40° to 100° C., into the heat stable β-modification. The β-modification produces good dyeing results, especially at high dyeing temperatures (e.g. up to 130° C.).

Different crystal modifications may be distinguished by their X-ray diffraction spectra. The interplanar spacing (hereinafter defined as the "d-value") in Angstrom units of the observed lines in the X-ray diffraction spectrum are measured by a Guinier/De Wolff camera using CuK$_α$ radiation. The intensity of the lines was estimated visually on a 4-step scale-s=strong; m=medium; w=weak and vw=very weak.

According to a further aspect of the invention, there is provided a β-modification of an isomeric mixture of compounds of formula Ia in a ratio of about 45% 5,6-dichloro to about 55% 6,7-dichloro compound

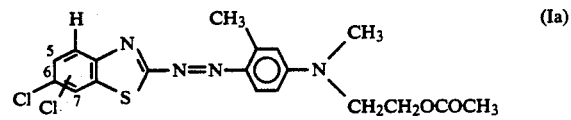

having $d_{CuKα}$-values (in $10^{-10}$m) as follows:

14.3 s; 9.5 m; 8.1 m; 7.3 w; 6.25 s; 5.0 w; 4.3 w; 3.9 w; 3.87 w; 3.6 s; 3.5 s; 3.38 s; and 3.15 w.

Compounds of formula I can be prepared by coupling 1 mol of a diazotised compound of formula II

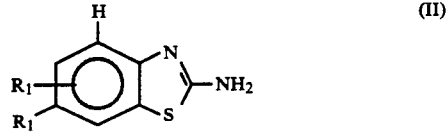

or a mixture thereof with 1 mol of a compound of formula III

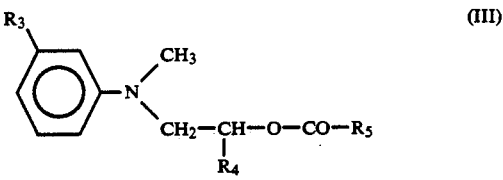

where the symbols are as defined above.

Preferably coupling is carried out at a temperature of −5° C. to +2° C.

Compounds of formulae II and III are known or may be made from known compounds by known methods. Usually, as compounds of formula II, a mixture of 5,6- and 6,7-dihalo-2-aminobenzothiazole is employed.

The compounds of formula I exhaust well at relatively low dyeing temperatures and over short dyeing periods, and the resulting dyeings have excellent fastness properties. In particular polyester material (particularly polyethylene-terephthalate fibre material) can be dyed at temperatures of 120° C. (and more) over 10–20 minutes. They are particularly suitable for "rapid dyeing". The compounds of formula I have a good rate of dye uptake, good bath exhaustion and good dyestuff yield (good depth of dyeing) as well as a high degree of fixation and good nuance consistency over a large temperature range. The resultant dyeings are level and the dyes are well fixed so that a reductive clearance step is in most cases not practically necessary. Particularly good fastness properties of the dyeings are: light fastness, fastness to rubbing, fastness to sweat, wash fastness and fastness to pleating.

In the following Examples, all parts and percentages are by weight and all temperatures are in °C. unless indicated to the contrary.

EXAMPLE 1

The compound of formula Ia

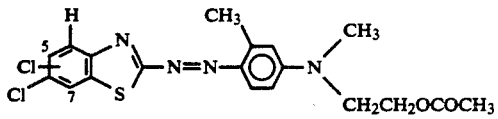

in which the 6,7- and 5,6-dichlorobenzothiazole diazo components are in about a 11:9 ratio can be prepared as follows:

21.9 Parts of a mixture of 2-amino-5,6-dichlorobenzothiazole and 2-amino-6,7-dichlorobenzothiazole (in about a 9:11 ratio) are dissolved in 46 parts of glacial acetic acid, 5 parts of propionic acid and 82 parts of phosphoric acid (85%) at 45° to 50° C. The mixture is then cooled to 0° to 2° C. and diazotised at this temperature by the dropwise additional of 32 parts of nitrosylsulphuric acid (40%) which is then stirred for 3 hours. The resulting diazonium salt solution is kept at 0° C. by cooling and is slowly added to a solution (at about 0° C.) of 20.7 parts of 1-(N-2'-acetoxyethyl-N-methyl)amino-3-methylbenzene in 2000 parts of glacial acetic acid, 50 parts of water, 150 parts of ice and 2 parts of amidosulphonic acid.

The resulting red dyestuff is filtered, washed acid-free with water and dried under vacuum at 60° C. The resulting dyestuff is a mixture with a ratio of 45% ±2% 5,6-dichloro-2-(2'-methyl-N-(4'-[N-2"-acetoxyethyl-N-methylamino]phenylazo)benzothiazole and 55% ±2% 6,7-dichloro-2-(2'-methyl-(4'-[N-2"-acetoxyethyl-N-methylamino]phenylazo)benzothiazole. This mixture dyes polyester a clear red colour with good fastness properties.

λ max is 536 nm.

EXAMPLE 2

21.9 Parts of the mixture (about 11:9 to 9:11) of 2-amino-5,6-dichlorobenzothiazole and 2-amino-6,7-dichlorobenzothiazole are dissolved in 46 parts of glacial acetic acid, 5 parts of propionic acid and 82 parts of phosphoric acid (85%) at 45°–50° C. The mixture is cooled to 0° to 2° and 32 parts of nitrosylsulphuric acid (40%) are added dropwise and stirred for 3 hours. The resulting diazonium salt solution is kept at about 0° C. by cooling and is slowly added to a solution also at about 0° C. of 22.3 parts of 1-(N-2-methoxycarbonyloxyethyl-N-methylamino)-3-methylbenzene in 200 parts of glacial acetic acid, 50 parts of water, 150 parts of ice and 2 parts of amidosulphonic acid. The resulting dye is filtered, washed acid-free with water and dried under vacuum at 60° C. The resulting dye is a mixture (about 11:9 to 9:11) of 5,6- and 6,7-dichloro-2-(2'-methyl-4'-N-methyl-N-[2"-methoxy-carbonyloxyethyl]amino)-phenylazo)benzothiazole. This mixture dyes polyester a clear red colour with good fastness properties.

λ max is 534 nm.

EXAMPLES 3 TO 19

Compounds of the formula

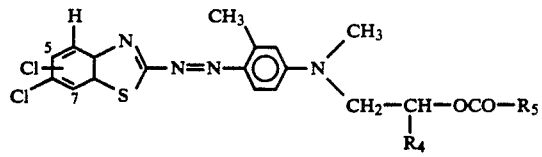

in which $R_4$ and $R_5$ are defined in the Table below, can be made from appropriate reactants by a method analogous to that of Example 1. As in Examples 1 and 2, the resulting dyes are mixtures (about 11:9 to 9:11) of the 5,6- and 6,7-dichloro-isomers.

TABLE

| Example No. | $R_4$ | $R_5$ | λ max. (DMF) |
|---|---|---|---|
| 3 | H | $-O-CH_2CH_2OC_2H_5$ | 535 |
| 4 | H | $-H$ | 534 |
| 5 | H | $-CH_2Cl$ | 535 |
| 6 | H | $-CH=CH_2$ | 535 |
| 7 | H | $-CH_2CH_2Cl$ | 536 |
| 8 | H | $-C_2H_5$ | 536 |
| 9 | H | $-CH_2OC_6H_5$ | 536 |
| 10 | $-CH_3$ | $-CH_3$ | 538 |
| 11 | $-CH_3$ | $-OCH_3$ | 535 |
| 12 | H | $-OC_2H_5$ | 535 |
| 13 | H | $-OCH_2CH(CH_3)_2$ | 535 |
| 14 | H | $-OC_4H_9n$ | 535 |
| 15 | H | $-OCH_2C_6H_5$ | 536 |
| 16 | H | $-OCH_2CH_2Cl$ | 534 |
| 17 | H | $-OCH_2CH=CH_2$ | 534 |
| 18 | H | $-OC_6H_5$ | 535 |
| 19 | H | $-OC_3H_7n$ | 535 |

EXAMPLE 20

The β-modification of the product of Example 1 (i.e. the mixture of compounds of formula Ia) can be formed by treating the product of Example 1, after coupling, with sufficient 2N NaOH to bring the pH into the range 2–4, stirring the mixture at 90° C. for half an hour and filtering, washing and drying the mixture.

APPLICATION EXAMPLE 1.0 Part of the product of Example 20 in the form of a powder preparation with a coupage of 65% is added to 4000 parts of water in a high temperature dyeing apparatus and the dye is dispersed. The pH is brought to about 5 by the addition of ammonium sulphate and formic acid. 100 Parts of a polyester fibre substrate (Dacron T56) is placed in the dyeing apparatus, which is then closed. The dyebath is warmed, under constant oscillation, at 3° per minute to 130° C. Dyeing is carried out at this temperature for 20 minutes, after which the bath is cooled to under 100° C. and the substrate is taken out. The substrate is rinsed once hot and once cold with water and then dried. The resulting dyeing has a level, clear bluish-red tone and has good fastness properties. From a colorimetric determination, about 5% of the dye remains in the liquor of the dyeing bath.

The Application Example can be repeated using an appropriate amount of any one of the mixtures of Examples 1 to 19 in place of that of Example 20.

What is claimed is:

1. A compound of the formula

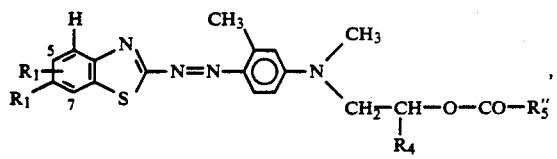

or a mixture of such compounds, wherein each
$R_1$ is independently halo,
$R_4$ is hydrogen or methyl, and
$R_5''$ is methyl or methoxy.

2. A compound according to claim 1, or a mixture of such compounds, wherein each $R_1$ is independently fluoro, chloro or bromo.

3. A compound according to claim 2, or a mixture of such compounds, wherein both $R_1$'s are identical.

4. A compound according to claim 3, or a mixture of such compounds, wherein each $R_1$ is chloro.

5. A compound according to claim 1, or a mixture of such compounds, wherein $R_4$ is hydrogen.

6. A compound according to claim 5 having the formula

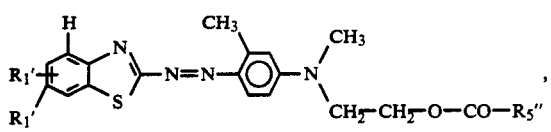

or a mixture of such compounds,
wherein each
$R_1'$ is independently fluoro, chloro or bromo, and
$R_5''$ is methyl or methoxy.

7. A compound according to claim 6, or a mixture of such compounds, wherein both $R_1'$'s are identical.

8. A mixture of two compounds according to claim 1 comprising a compound wherein the floating $R_1$ is in the 5-position and a compound wherein the floating $R_1$ is in the 7-position, wherein all
four $R_1$'s are identical,
both $R_4$'s are identical, and
both $R_5'''$'s are identical.

9. A mixture according to claim 8 wherein the ratio of the two compounds is 2:1 to 1:2.

10. A mixture according to claim 9 wherein the ratio of the two compounds is 3:2 to 2:3.

11. A mixture according to claim 10 wherein the ratio of the two compounds is 11:9 to 9:11.

12. A mixture according to claim 8 wherein both $R_4$'s are hydrogen.

13. A mixture according to claim 12 wherein each $R_1$ is fluoro, chloro or bromo.

14. A mixture according to claim 13 wherein the ratio of the two compounds is 2:1 to 1:2.

15. A mixture according to claim 14 wherein the ratio is 3:2 to 2:3.

16. A mixture according to claim 15 of the compounds of the formula

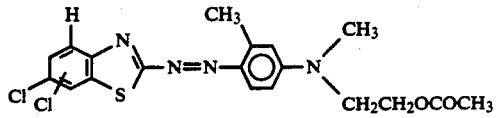

wherein the ratio of the 6,7-isomer to the 5,6-isomer is about 11:9.

17. The β-modification of a mixture according to claim 16, said β-modification having an X-ray diffraction spectrum (Cu-K$_{α0}$ radiation) exhibiting lines at d-values of 14.3 (strong), 9.5 (medium), 8.1 (medium), 7.3 (weak), 6.25 (strong), 5.0 (weak), 4.3 (weak), 3.9 (weak), 3.87 (weak), 3.6 (strong), 3.5 (strong) 3.38 (strong) and 3.14 (weak) Å.

18. A mixture according to claim 15 of the compounds of the formula

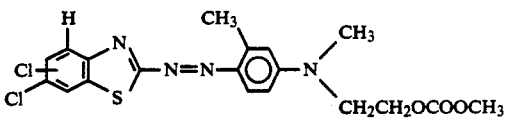

in a ratio of about 11:9 to 9:11.

19. A process for dyeing a substrate comprising applying to the substrate a compound according to claim 1, or a mixture thereof.

20. A process according to claim 19 comprising applying to a polyester substrate the β-modification of a mixture of the compounds of the formula

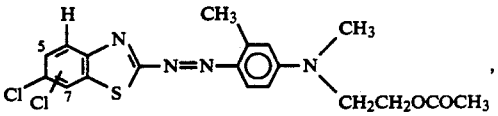

wherein the ratio of 6,7-isomer to the 5,6-isomer is about 11:9, said β-modification having an X-ray diffraction spectrum (Cu-K$_α$ radiation) exhibiting lines at d-values of 14.3 (strong), 9.5 (medium), 8.1 (medium), 7.3 (weak), 6.25 (strong), 5.0 (weak), 4.3 (weak), 3.9 (weak), 3.87 (weak), 3.6 (strong), 3.5 (strong), 3.38 (strong) and 3.15 (weak) Å.

* * * * *